United States Patent [19]
Goto

[11] Patent Number: 5,317,557
[45] Date of Patent: May 31, 1994

[54] OPTICAL HEAD FOR RECORDING AND REPRODUCING INFORMATION ON AND/OR FROM OPTICAL RECORD MEDIUM

[75] Inventor: Atsuo Goto, Hachioji, Japan

[73] Assignee: Olympus Optical Co., Ltd., Tokyo, Japan

[21] Appl. No.: 706,860

[22] Filed: May 29, 1991

[30] Foreign Application Priority Data

May 31, 1990 [JP] Japan .................. 2-139839

[51] Int. Cl.$^5$ .................................. G11B 7/00
[52] U.S. Cl. .................... 369/112; 369/44.12
[58] Field of Search ........... 369/112, 119, 116, 106, 369/100, 44.12, 44.14

[56] References Cited

U.S. PATENT DOCUMENTS

| | | | |
|---|---|---|---|
| 4,733,065 | 3/1988 | Hoshi et al. | 250/203.2 |
| 4,823,335 | 4/1989 | Shikama et al. | 369/112 |
| 5,050,153 | 9/1991 | Lee | 369/44.13 |
| 5,051,974 | 9/1991 | Taniguchi et al. | 369/44.12 |
| 5,115,423 | 5/1992 | Mazda, Jr. | 369/44.12 |

Primary Examiner—Paul M. Dzierzynski
Assistant Examiner—Drew A. Dunn
Attorney, Agent, or Firm—Stevens, Davis, Miller & Mosher

[57] ABSTRACT

In an optical head for recording and reproducing information on and from an optical record medium such as optical disk and optical card including a semiconductor laser diode for emitting a laser beam having an elliptical cross sectional configuration, a collimator lens for converting the laser beam emitted from the laser diode into a parallel laser beam, a beam shaping prism for converting the laser beam emanating from the collimator lens into a laser beam having a circular cross sectional configuration, a transmissive diffraction grating for dividing the laser beam emanating from the beam shaping prism into a plurality of laser beams and an objective lens for projecting the laser beams emanating from the transmissive diffraction grating onto the optical record medium, in order to avoid the influence of a laser beam which is reflected by the transmissive diffraction grating and is made incident upon a laser emitting point of the laser diode, the transmissive diffraction grating is inclined with respect to an optical axis to such an extent that the laser beam reflected by the transmissive diffraction grating is not made incident upon the laser emitting point. Then, the semiconductor laser diode can generate the laser beam stably, and thus the recording and reproducing can be performed accurately.

8 Claims, 3 Drawing Sheets

FIG_1
PRIOR ART
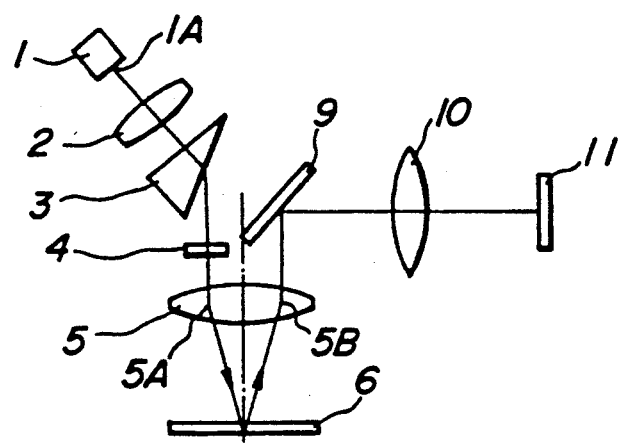
FIG_2
PRIOR ART
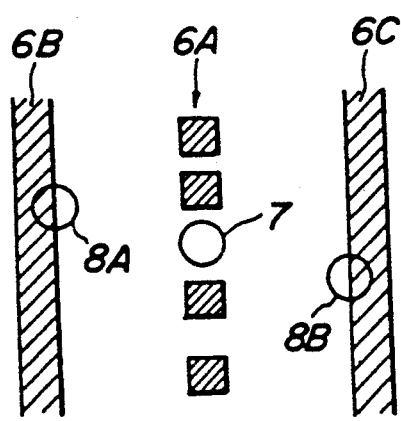

FIG._5
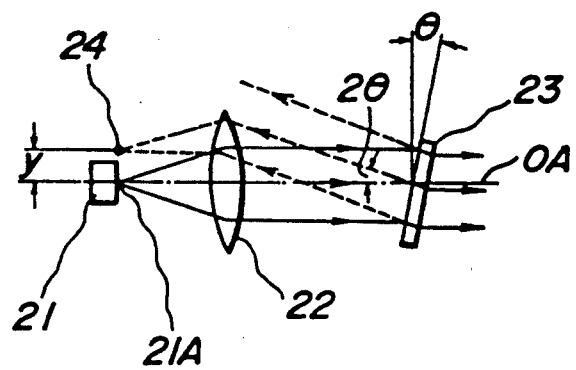
FIG._6
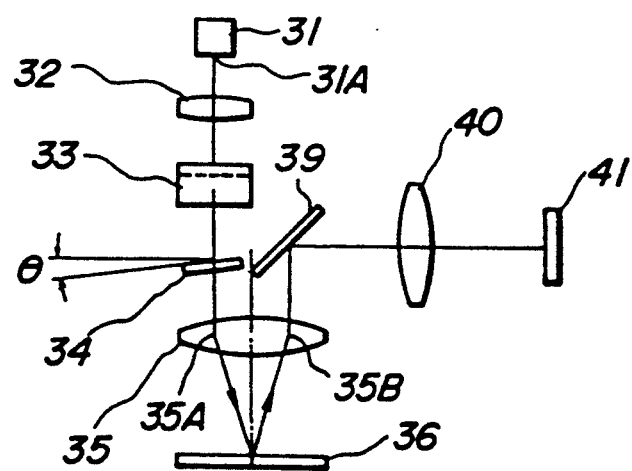

OPTICAL HEAD FOR RECORDING AND REPRODUCING INFORMATION ON AND/OR FROM OPTICAL RECORD MEDIUM

BACKGROUND OF THE INVENTION

1. Field of the Invention and Related Art Statement

The present invention relates to an optical head for recording and/or reproducing information on and/or from an optical record medium comprising a semiconductor laser diode for emitting a diverging laser beam, a collimator lens for converting the diverging laser beam emitted by the semiconductor laser diode into a parallel laser beam, a diffraction grating for dividing the parallel laser light beam emanating from the collimator lens into a plurality of laser beams, and an objective lens for projecting said plurality of laser beams onto the optical record medium.

The above mentioned optical head using three or two laser beams have been proposed for recording and/or reproducing the information on and/or from the optical record medium such as optical disk, optical card and opto-magnetic disk. In this kind of the optical head the single laser beam emitted by the laser diode is divided into a plurality of laser beams with the aid of the diffraction grating. For instance, in U.S. Pat. No. 4,598,393, there is disclosed an optical head for use in an optical card writer and/or reader. In this known optical head, the laser light beam is divided into three light beams by means of the diffraction grating.

In the optical head of the type mentioned above, since a so-called on-axis method is adopted, a part of laser beam reflected by the optical record medium is made incident upon the semiconductor laser diode, so that the intensity of the laser beam emitted by the semiconductor laser diode might fluctuate, so that the information could not recorded correctly and S/N of a reproduced signal becomes deteriorated. In order remove such a drawback, in Japanese Patent Application Laid-open Publications Kokai Sho Nos. 61-150391 and 62-205528, there is described another known optical head using a so-called off-axis method in which the laser beams are made incident upon the record medium from directions which are inclined with respect to an optical axis of the objective lens which is perpendicular to the plane of the optical record medium.

FIG. 1 is a schematic view showing the known optical head utilizing the off-axis method. A diverging laser beam emitted from a laser emitting point 1A of a semiconductor laser diode 1 is converted by a collimator lens 2 into a parallel laser beam, and then the parallel laser beam is transmitted through a beam shaping prism 3 which serves to convert the laser beam having a elliptical cross sectional configuration into a laser beam having a substantially circular cross sectional configuration.

Then the parallel laser beam having the circular cross sectional configuration is made incident on a diffraction grating 4 which serves to divide the incident laser beam into a plurality of laser beams. Among these beams, three laser beams of zero order and ± first orders are selected and are made incident upon a portion 5A of an objective lens 5 which is deviated from an optical axis of the objective lens. These three laser beams emanating from the objective lens 5 are then focused onto an optical record medium 6 from directions which are inclined with respect to the optical axis which is perpendicular to a surface of the record medium.

As illustrated in FIG. 2, a central spot 7 formed by the zero order beam is projected on an information pit array 6A, and spots 8A and 8B formed by the ± first order laser beams are projected on guide tracks 6B and 6C, respectively, which are situated on respect sides of the information pit array 6A. In an on-track condition shown in FIG. 2, substantially half portions of the spots 8A and 8B are made incident upon the inner edges of the guide tracks 6B and 6C, respectively.

Then, three laser beams reflected by the optical record medium 6 are made incident upon a portion 5B of the objective lens 5 which is diametrically opposed to the portion 5A with respect to the optical axis, and are made incident upon a photodetector 11 by means of reflection mirror 9 and detection lens 10. As illustrated in FIG. 3, the photodetector 11 comprises light receiving regions 11A and 11B which are arranged side by side for receiving the zero order beam and light receiving regions 11C and 11D which receive the ± first order beams, respectively. Then an information reproducing signal is derived by a sum of outputs of the pairwised light receiving regions 11A and 11B, a focusing error signal is derived by a difference between the outputs of the pairwised light receiving regions 11A and 11B, and a tracking error signal is obtained by a difference between outputs of the light receiving regions 11C and 11D.

In the above explained known optical head using the off-axis method, the laser beams are made incident upon the optical record medium 6 from the inclined directions, so that the laser beams reflected by the optical record medium do not propagate along the same path as the incident laser beams, so that the reflected laser beams are not made incident upon the semiconductor laser diode 1.

However, in the optical head shown in FIG. 1, since the diffraction grating 4 is arranged perpendicularly to the optical axis, laser beam reflected by a surface of the diffraction grating 4 is made incident upon the light emitting point 1A of the semiconductor laser diode 1 by means of the beam shaping prism 3 and collimator lens 2. Therefore, the semiconductor laser diode 1 could not generate the laser beam stably, and the reading and writing operation could not be performed stably and accurately.

Usually in order to stabilize the output power of the semiconductor laser diode, a laser beam emitted from a rear surface backwardly is monitored and the driving current for the laser diode is adjusted such that the backward beam power becomes constant. A curve A in FIG. 4 shows the relation between the laser driving current IOP and the backward monitor current IPIN in the known optical head illustrated in FIG. 1. This curve A deviates from an ideal curve B to a great extent. Therefore, the control for the output power of the semiconductor laser diode could not be performed stably and accurately.

SUMMARY OF THE INVENTION

The present invention has for its object to provide a novel and useful optical head, in which the laser beam reflected by the diffraction grating is not made incident upon the laser emitting point of the semiconductor laser diode, so that the output power of the laser diode can be controlled stably and accurately by monitoring the backward beam and thus the writing and reading operation can be carried out always correctly.

According to the invention, an optical head for recording and/or reproducing information on and/or from an optical record medium comprises a semiconductor laser diode for emitting a diverging laser beam, a collimator lens for converting the diverging laser beam emitted from a laser emitting point of the semiconductor laser diode into a parallel laser beam, a transmissive diffraction grating for dividing the parallel laser light beam emanating from the collimator lens into a plurality of laser beams, and an objective lens for projecting said plurality of laser beams onto the optical record medium, wherein said transmissive diffraction grating is arranged to be inclined with respect to a plane which is perpendicular to an optical axis.

BRIEF DESCRIPTION OF THE DRAWINGS

FIG. 1 is a schematic view showing the known optical head using the off-axis method;

FIG. 2 is a plan view illustrating the positional relation between three laser beam spots and tracks on the optical record medium;

FIG. 5 is a schematic view showing a major portion of the optical head according to the invention; and FIG. 6 is a schematic view illustrating an embodiment of the optical head according to the invention.

DESCRIPTION OF THE PREFERRED EMBODIMENTS

Figure 3:
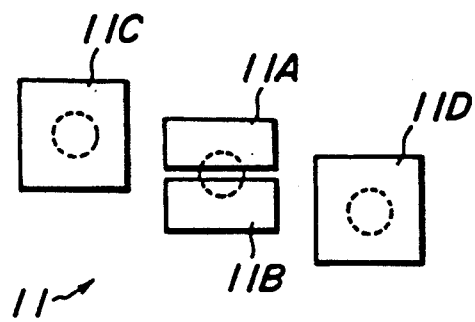
FIG. 3 is a plan view depicting the detailed construction of the photodetector shown in FIG. 1.

FIG. 5 is a schematic view depicting a major portion of the optical head according to the present invention. As illustrated in FIG. 5, according to the invention, a diverging laser beam emitted from a laser emitting point 21A of a semiconductor laser diode 21 is converted into a parallel laser beam by means of a collimator lens 22, and then the parallel laser beam emanating from the collimator lens 22 is made incident upon a transmissive diffraction grating 23 which is arranged to be inclined with respect to a plane perpendicular to an optical axis OA by a predetermined angle $\theta$. Then, a part of the incident laser beam is reflected by a surface of the transmissive diffraction grating 23 at a reflection angle $2\theta$. Therefore, the reflected laser beam is focused by the collimator lens 22 at a point 24 which is far from the laser emitting point 21A of the semi-conductor laser diode 21. In this manner, according to the invention the laser beam reflected by the transmissive diffraction grating 23 is not made incident upon the laser emitting point 21A of the semiconductor laser diode 21, and thus the semiconductor laser diode can generate the laser beam stably.

When a focal length of the collimator lens 22 is f, a distance y between the laser emitting point 21A on the semiconductor laser diode 21 and the point 24 at which the laser beam reflected by the transmissive diffraction grating 23 is focused can be expressed by $y = f \tan 2\theta$. When the distance y is set to 0.1 mm by considering a size of the laser emitting point 21A (usually this amounts to several $\mu$m), and dispersion and aberrations due to the transmissive diffraction grating 23, then the inclination angle $\theta$ becomes 0.3° at the focal length f of 10 mm. That is to say, when the transmissive diffraction grating 23 is inclined with respect to the plane perpendicular to the optical axis OA by 0.3°, it is possible to avoid the influence of the laser beam reflected by the transmissive diffraction grating upon the stable emission of the laser beam.

Since the inclination angle is very small, the change in the property of the transmissive diffraction grating 23 can be ignored, but if shift of the optical axis, change in the phase difference, change in the pitch, etc. due to the inclination of the transmissive diffraction grating, the transmissive diffraction grating may be designed such that these influences can be avoided. In this case, when the transmissive diffraction grating 23 is rotated about an axis which situates in a plane of gratings of the transmissive diffraction grating and is perpendicular to the direction of the gratings, the grating pitch is not changed, so that it is sufficient to design the transmissive diffraction grating so as to compensate the change in the phase difference and the shift in the optical axis.

The above mentioned function can be equally obtained in a case in which a beam shaping prism is arranged between the collimator lens 22 and the transmissive diffraction grating 23. In this case, when the direction in which the cross sectional configuration of the laser beam is changed is aligned with the direction in which the gratings extend, the reflection angle of the laser beam reflected by the transmissive diffraction grating with respect to the optical axis OA is changed by the beam shaping prism. Therefore, the necessary inclination angle of the transmissive diffraction grating has to be determined by considering the change in the reflection angle of the laser beam.

FIG. 6 is a schematic view depicting an embodiment of the optical head according to the invention. Also in this embodiment, the off-axis method is adopted. A diverging laser beam emitted from a laser emitting point 31A of a semiconductor laser diode 31 is converted into a parallel laser beam by means of a collimator lens 32 and then the parallel laser beam is transmitted through a beam shaping prism 33 to convert the incident laser beam having the elliptical cross sectional configuration into a laser beam having a substantially circular cross sectional configuration. Then the parallel laser beam having the circular cross sectional configuration is made incident upon a transmissive diffraction grating 34 which is arranged to be inclined with respect to a plane which is perpendicular to the optical axis by an inclination angle $\theta$. Among a plurality of laser beams emanating from the transmissive diffraction grating 34, zero order beam and $\pm$ first order beams are made incident upon a portion 35A of an objective lens 35. Then, the three laser beams are projected onto a optical record medium from directions which are inclined with respect to the optical axis. The laser beams reflected by the optical record medium 36 are made incident upon a portion 35B of the objective lens 35 and then the laser beam emanating from the objective lens 35 are made incident upon a photodetector 41 by means of reflection mirror 39 and detection lens 40. The portion 35B of the objective lens 35 is diametrically opposed to the portion 35A.

The construction of the present embodiment other than the arrangement of the transmissive diffraction grating 34 is the same as that of the known optical head illustrated in FIG. 1.

In the present embodiment, the transmissive diffraction grating 34 is arranged such that a direction in which gratings of the transmissive diffraction grating extend is in parallel with the plane of the drawing of FIG. 6, and the transmissive diffraction grating is rotated about an axis which is perpendicular to the plane of the drawing by an angle of 1°. Further, the beam shaping prism 33 is arranged such that a direction in which the cross sectional configuration is changed is perpendicular to the direction of the gratings of the transmissive diffraction grating 34. Therefore, the reflection angle of the laser beam reflected by the transmissive diffraction grating is not changed after the reflected laser beam is transmitted through the beam shaping prism, and therefore the inclination angle of the transmissive diffraction grating can be determined simply without considering the beam shaping prism.

Figure 4:
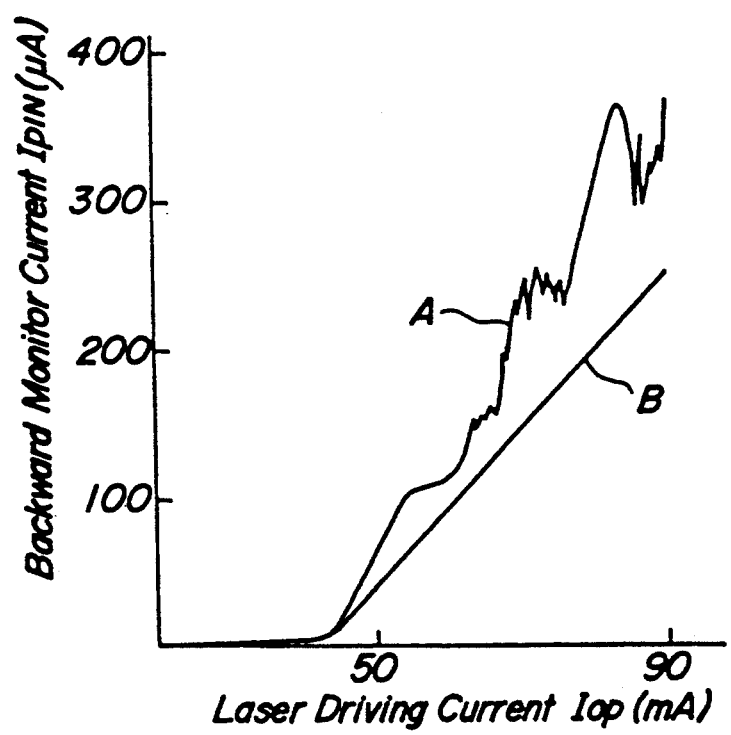
FIG. 4 is a graph representing the relation between the laser driving current and the backward beam monitor current.

In the present embodiment, the laser beam reflected by the transmissive diffraction grating 34 makes an angle of 2° with respect to the optical axis after passing through the beam shaping prism 33. Therefore, when the collimator lens 32 has a focal length of 7 mm, a point at which the laser beam reflected by the transmissive diffraction grating 34 is focused is deviated from the laser emitting point 31A of the semiconductor laser diode 31 by a distance $y = 7 \times \tan 2° = 0.24$ mm. In this manner, the laser beam reflected by the transmissive diffraction grating 34 is not made incident upon the laser emitting point 31A of the semiconductor laser diode 31, and therefore the semiconductor laser diode can generate the laser beam stably and the information recording and reproducing operation can be performed stably and accurately. When a laser beam emitted backwardly is monitored and the laser driving current is controlled by the thus monitored backward beam current, it is possible to control the laser power very precisely, because the relation between the laser driving current IOP and the backward beam current IPIN can be expressed substantially by the ideal curve B in FIG. 4. In this manner, the laser power can be controlled accurately and stably.

The present invention is not limited to the embodiment explained above, but many modifications and alternations may be conceived by those skilled in the art within the scope of the invention. For instance, in the embodiment shown in FIG. 6, the beam shaping prism 33 is rotated by 90° upon compared with arrangement shown in FIG. 1, but it may be arranged in the same manner as that shown in FIG. 1. Further, in the embodiment shown in FIG. 6, the beam shaping prism 33 and transmissive diffraction grating 34 are arranged such that the direction in which the cross sectional configuration of the beam shaping prism is perpendicular to the direction in which the gratings of the transmissive diffraction grating extend, but these elements may be arranged such that these directions are in parallel with each other. Moreover, according to the invention any method other than the off-axis method may be adopted. For instance, the laser beams may be incident upon a central portion of the objective lens and the laser beams may be made incident upon the optical record medium perpendicularly thereto. Further, in the above embodiment, three laser beams are used to record or reproduce the information on or from the optical record medium as well as to derive the focusing and tracking error signals, but two laser beams may be used.

As explained above, in the optical head according to the invention, the transmissive diffraction grating for obtaining a plurality of laser beams is arranged to be inclined with respect to the plane which is perpendicular to the optical axis such that the laser beam reflected by the transmissive diffraction grating is not made incident upon the laser emitting point of the semi-conductor laser diode, so that the laser beam can be generated stably and the recording and reproducing can be performed stable and accurately. Further the laser power can be precisely and stable controlled by monitoring the backward beam.

What is claimed is:

1. An optical head for recording and/or reproducing information on and/or from an optical record medium, said optical head comprising a semiconductor laser diode for emitting a diverging laser beam, a collimator lens for converting the diverging laser beam emitted from a laser emitting point of the semiconductor laser diode into a parallel laser beam, a transmissive diffraction grating for dividing the parallel laser light beam emanating from the collimator lens into a plurality of laser beams, and an objective lens for projecting said plurality of laser beams onto the optical record medium, wherein said transmissive diffraction grating is arranged to be inclined with respect to a plane which is perpendicular to an optical axis of light from the semiconductor laser diode incident on the transmissive diffraction grating.

2. An optical head according to claim 1, wherein said transmissive diffraction grating is inclined by such an angle that the laser beam reflected by the transmissive diffraction grating is not made incident upon the laser emitting point of the semiconductor laser diode.

3. An optical head according to claim 1, wherein said transmissive diffraction grating is inclined about an axis which situates in a plane of gratings of the transmissive diffraction grating and is perpendicular to a direction in which the gratings of the transmissive diffraction grating extend.

4. An optical head according to claim 1, wherein said transmissive diffraction grating is inclined about an axis which situates in a plane of gratings of the transmissive diffraction grating and is in parallel with a direction in which the gratings of the transmissive diffraction grating extend.

5. An optical head according to claim 1, wherein said semiconductor laser diode, collimator lens, transmissive diffraction grating and objective lens are arranged such that said plurality of laser beams emanating from the transmissive diffraction grating are made incident upon a first portion of the objective lens which is shifted from a center portion of the objective lens so that the plurality of laser beams are projected onto the optical record medium from directions which are inclined with respect to a direction perpendicular to a surface of the optical record medium and a plurality of laser beams reflected by the optical record medium are made incident upon a second portion of the objective lens which is diametrically opposed to said first portion.

6. An optical head according to claim 1, further comprising a beam shaping prism arranged between the collimator lens and the transmissive diffraction grating for converting the laser beam emanating from the collimator lens and having an elliptical cross sectional configuration into a laser beam having a substantially circular cross sectional configuration.

7. An optical head according to claim 6, wherein said beam shaping prism is arranged such that a direction in which the cross sectional configuration of the laser beam is changed is in parallel with an axis about which the transmissive diffraction grating is inclined.

8. An optical head according to claim 7, wherein said transmissive diffraction grating is arranged such that a direction in which gratings of the transmissive diffraction grating extend is perpendicular to said axis about which said transmissive diffraction grating is inclined.

* * * * *